(12) United States Patent
Chishima

(10) Patent No.: US 11,608,475 B2
(45) Date of Patent: *Mar. 21, 2023

(54) FUEL PRODUCTION SYSTEM FOR PRODUCING LIQUID FUEL FROM BIOMASS FEEDSTOCK AND RENEWABLE ENERGY

(71) Applicant: HONDA MOTOR CO., LTD., Tokyo (JP)

(72) Inventor: Hiroshi Chishima, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 7 days.

This patent is subject to a terminal disclaimer.

(21) Appl. No.: 17/204,942

(22) Filed: Mar. 18, 2021

(65) Prior Publication Data

US 2021/0292665 A1    Sep. 23, 2021

(30) Foreign Application Priority Data

Mar. 19, 2020  (JP) ............................. JP2020-048937

(51) Int. Cl.
  *C10J 3/72*  (2006.01)
  *C25B 1/04*  (2021.01)
  *C10J 3/48*  (2006.01)

(52) U.S. Cl.
  CPC .............. *C10J 3/482* (2013.01); *C10J 3/723* (2013.01); *C25B 1/04* (2013.01);
  (Continued)

(58) Field of Classification Search
  CPC ........ C10J 2300/1684; C10J 2300/1659; C10J 2300/1665; C10J 3/723; C10J 3/00;
  (Continued)

(56) References Cited

U.S. PATENT DOCUMENTS 3,929,431 A * 12/1975 Koh .................. B01J 23/04
                                                48/214 R
2001/0054256 A1   12/2001 Katayama
(Continued)

FOREIGN PATENT DOCUMENTS

JP    2001316681 A    11/2001
JP    2002003864 A    1/2002
(Continued)

*Primary Examiner* — Imran Akram
(74) *Attorney, Agent, or Firm* — CKC & Partners Co., LLC

(57) ABSTRACT

A fuel production system includes a gasification unit including a gasification furnace that gasifies biomass feedstock to produce a syngas; a liquid fuel production unit that produces a liquid fuel from the syngas produced by the gasification unit; an electrolysis unit that produces hydrogen from water using electric power generated using renewable energy; a hydrogen tank that stores the hydrogen produced by the electrolysis unit; a remaining hydrogen amount determining section that determines the amount of hydrogen remaining in the hydrogen tank; a hydrogen supply unit that supplies the hydrogen from the hydrogen tank to the gasification unit; and a control unit that performs a hydrogen consumption increasing control to reduce the $H_2/CO$ ratio of the syngas produced by reaction in the gasification furnace and to increase the amount of hydrogen supplied by the hydrogen supply unit, when the remaining amount of hydrogen is more than a predetermined amount.

20 Claims, 7 Drawing Sheets

(52) U.S. Cl.
CPC ............ *C10J 2300/0916* (2013.01); *C10J 2300/0973* (2013.01); *C10J 2300/1618* (2013.01); *C10J 2300/1659* (2013.01); *C10J 2300/1665* (2013.01); *C10J 2300/1684* (2013.01); *C10J 2300/1693* (2013.01); *C10J 2300/1807* (2013.01); *Y02E 60/36* (2013.01)

(58) Field of Classification Search
CPC ........ C10J 2300/1618; C10J 2300/1693; C10J 2300/1807; C10J 2300/0966; Y02E 60/36; Y02E 60/32; C25B 1/04; C25B 15/02; C25B 15/081; C10G 2/30
See application file for complete search history.

(56) References Cited

U.S. PATENT DOCUMENTS

| | | | |
|---|---|---|---|
| 2002/0087037 | A1 | 7/2002 | Kaneko et al. |
| 2009/0235587 | A1* | 9/2009 | Hawkes .................. C25B 1/00 48/202 |
| 2010/0076097 | A1* | 3/2010 | Metz .................. C25B 15/081 422/186 |
| 2010/0177861 | A1* | 7/2010 | Lecomte .................. C01B 3/34 376/325 |
| 2011/0158858 | A1* | 6/2011 | Alves Ramalho Gomes .............. C10K 1/32 422/187 |
| 2011/0169269 | A1* | 7/2011 | Devine .................. C25B 9/70 290/55 |
| 2011/0185634 | A1 | 8/2011 | Prestel |
| 2012/0222353 | A1* | 9/2012 | Raju .................. C10K 1/004 48/127.5 |
| 2014/0093795 | A1* | 4/2014 | Sone .................. H01M 8/186 429/418 |
| 2015/0128597 | A1* | 5/2015 | Schlak .................. B60K 5/08 60/719 |
| 2019/0390158 | A1* | 12/2019 | Dyson .................. C12P 13/04 |
| 2021/0215095 | A1* | 7/2021 | Hirokane ................ F02B 43/08 |

FOREIGN PATENT DOCUMENTS

| | | |
|---|---|---|
| JP | 2002012877 A | 1/2002 |
| JP | 2002193858 A | 7/2002 |
| WO | WO-2019151461 A1 * | 8/2019 ............ C01B 3/36 |

\* cited by examiner

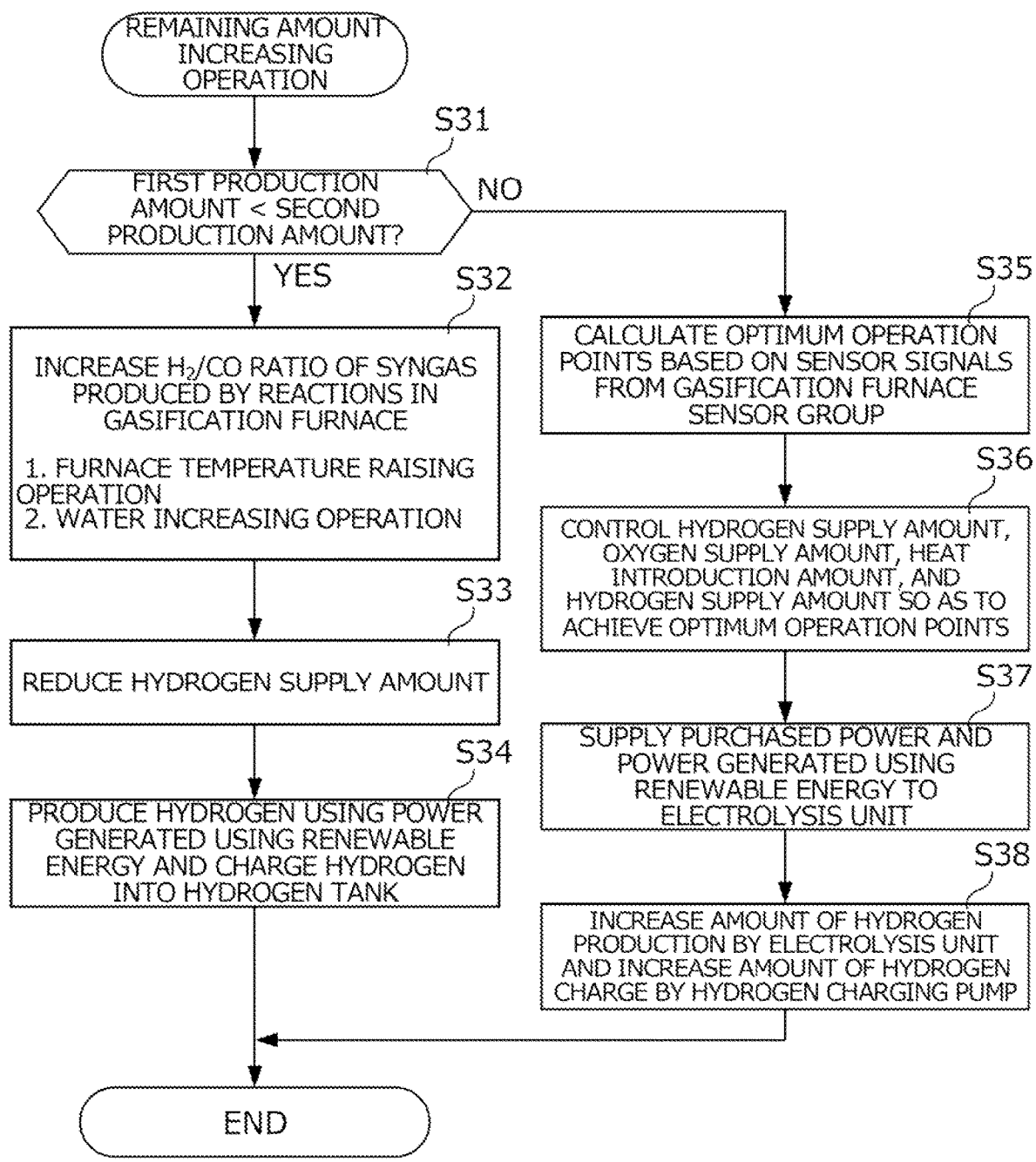

FUEL PRODUCTION SYSTEM FOR PRODUCING LIQUID FUEL FROM BIOMASS FEEDSTOCK AND RENEWABLE ENERGY

This application is based on and claims the benefit of priority from Japanese Patent Application No. 2020-048937, filed on 19 Mar. 2020, the content of which is incorporated herein by reference.

BACKGROUND OF THE INVENTION

Field of the Invention

The present invention relates to a fuel production system. More specifically, the present invention relates to a fuel production system that produces a liquid fuel using biomass feedstock and renewable energy.

Related Art

In recent years, electrosynthetic fuels have attracted attention as alternatives to fossil fuels. Such electrosynthetic fuels are produced from materials including: hydrogen produced using power generated using renewable energy; and a carbon source such as biomass or carbon dioxide discharge from factories.

A common process for producing a liquid fuel, such as methanol or gasoline, using biomass as feedstock is as follows. The process includes a gasification step including gasifying specifically pretreated biomass feedstock together with water and oxygen in a gasification furnace to produce a syngas containing hydrogen and carbon monoxide; a cleaning step including cleaning the produced syngas and removing tar; a $H_2/CO$ ratio adjusting step including adjusting the $H_2/CO$ ratio of the cleaned syngas to a target ratio depending on the liquid fuel to be produced; a desulfurization step including removing sulfur components from the syngas after the $H_2/CO$ ratio adjusting step; and a fuel production step including producing a liquid fuel from the syngas after the desulfurization step. The liquid fuel is produced from the biomass feedstock through the process.

In this process, the $H_2/CO$ ratio of the syngas produced through the gasification step often remains short of the target ratio, which means that the syngas is short of hydrogen. In the $H_2/CO$ ratio adjusting step, therefore, hydrogen is produced by reaction of carbon monoxide with water to increase the $H_2/CO$ ratio to the target ratio.

Patent Document 1 discloses an invention relating to a fuel production system that produces an electrosynthetic fuel from biomass feedstock as mentioned above. In this system, hydrogen is produced using power generated using renewable energy and then mixed into a syngas, which is produced using a gasification furnace, to adjust the $H_2/CO$ ratio to a target ratio.

Patent Document 1: Japanese Unexamined Patent Application, Publication No. 2002-193858

SUMMARY OF THE INVENTION

The fuel production system disclosed in Patent Document 1 includes an electrolysis apparatus that produces hydrogen using electric power generated using renewable energy; and a hydrogen tank that stores the produced hydrogen. In the system disclosed in Patent Document 1, since wind power and sunlight, which are assumed to be renewable forms of energy in Patent Document 1, are not always generated in a constant amount, the amount of hydrogen remaining in the hydrogen tank will significantly fluctuate depending on the environmental conditions. In the system, therefore, if the remaining amount of hydrogen is close to the maximum capacity of the hydrogen tank, hydrogen may fail to be produced using renewable energy, and if the remaining amount of hydrogen is close to the minimum capacity of the hydrogen tank, the electrosynthetic fuel may fail to be produced. Patent Document 1 does not sufficiently consider such problems.

It is an object of the present invention to provide a fuel production system that ensures the use of a sufficient amount of renewable energy for the production of a liquid fuel.

(1) A fuel production system (e.g., a fuel production system 1 described later) according to an aspect of the present invention is for producing a liquid fuel from biomass feedstock and includes a gasification unit (e.g., a gasification unit 3 described later) including a gasification furnace (e.g., a gasification furnace 30 described later) that gasifies biomass feedstock to produce a syngas including hydrogen and carbon monoxide; a liquid fuel production unit (e.g., a liquid fuel production unit 4 described later) that produces a liquid fuel from the syngas produced by the gasification unit; an electrolysis unit (e.g., an electrolysis unit 60 described later) that produces hydrogen from water using electric power generated using renewable energy; a hydrogen tank (e.g., a hydrogen tank 62 described later) that stores the hydrogen produced by the electrolysis unit; a remaining hydrogen amount determining section (e.g., a pressure sensor 63 and a control unit 7 described later) that determines the amount of hydrogen remaining in the hydrogen tank; a hydrogen supply unit (e.g., a hydrogen supply pump 64 described later) that supplies the hydrogen from the hydrogen tank to the gasification unit; and a control unit (e.g., a control unit 7 described later) that performs a hydrogen consumption increasing control to reduce the $H_2/CO$ ratio of the syngas produced by reaction in the gasification furnace and to increase the amount of hydrogen supplied by the hydrogen supply unit when the remaining amount of hydrogen is more than a predetermined amount. As used herein, the expression "syngas produced by reaction in the gasification furnace" refers to a part of the syngas in the gasification furnace, exclusive of hydrogen supplied from outside the gasification furnace. In other words, the "syngas produced by reaction in the gasification furnace" is equivalent to a syngas produced in the gasification furnace when the amount of hydrogen supplied by the hydrogen supply unit is zero.

(2) The system preferably further includes a heating unit (e.g., a heating unit 34 described later) that heats the gasification furnace, in which the control unit preferably reduces the amount of heat introduced from the heating unit into the gasification furnace to reduce the $H_2/CO$ ratio of the syngas produced by reaction in the gasification furnace.

(3) The system preferably further includes a water supply unit (e.g., a water supply unit 32 described later) that supplies water into the gasification furnace, in which the control unit preferably reduces the amount of water supplied from the water supply unit into the gasification furnace to reduce the $H_2/CO$ ratio of the syngas produced by reaction in the gasification furnace.

(4) The system preferably further includes a heating unit that heats the gasification furnace; and a water supply unit that supplies water into the gasification furnace, in which the control unit preferably reduces either or both of the amount of heat introduced from the heating unit into the gasification furnace and the amount of water supplied from the water supply unit into the gasification furnace so as to reduce the amount of carbon dioxide emitted in the gasification unit.

(5) In the system, the control unit preferably selects and performs one of the hydrogen consumption increasing control and a hydrogen production reducing control to sell electric power generated using renewable energy and to reduce the amount of hydrogen produced by the electrolysis unit, and the control unit preferably calculates a first gain available if the hydrogen consumption increasing control is performed and calculates a second gain available if the hydrogen production reducing control is performed, and the control unit preferably performs the hydrogen consumption increasing control when the first gain is larger than the second gain, and preferably performs the hydrogen production reducing control when the first gain is smaller than the second gain.

(6) In the system, the control unit preferably calculates the first gain based on a gain available if the hydrogen consumption increasing control is performed to reduce the amount of heat introduced into the gasification furnace and based on a gain available if the efficiency of syngas production in the gasification furnace is increased.

(7) A fuel production system according to another aspect of the present invention is for producing a liquid fuel from biomass feedstock and includes a gasification unit that heats biomass feedstock in a gasification furnace to produce a syngas including hydrogen and carbon monoxide; a liquid fuel production unit that produces a liquid fuel from the syngas produced by the gasification unit; an electrolysis unit that produces hydrogen from water using electric power generated using renewable energy; a hydrogen tank that stores the hydrogen produced by the electrolysis unit; a remaining hydrogen amount determining section that determines the amount of hydrogen remaining in the hydrogen tank; a hydrogen supply unit that supplies the hydrogen from the hydrogen tank to the gasification unit; and a control unit that performs a hydrogen consumption reducing control to increase the $H_2/CO$ ratio of the syngas produced by reaction in the gasification furnace and to reduce the amount of hydrogen supplied by the hydrogen supply unit, when the remaining amount of hydrogen is less than a predetermined amount.

(8) The system preferably further includes a heating unit that heats the gasification furnace, in which the control unit preferably increases the amount of heat introduced from the heating unit into the gasification furnace to increase the $H_2/CO$ ratio of the syngas produced by reaction in the gasification furnace.

(9) The system preferably further includes a water supply unit that supplies water into the gasification furnace, in which the control unit preferably increases the amount of water supplied from the water supply unit into the gasification furnace to increase the $H_2/CO$ ratio of the syngas produced by reaction in the gasification furnace.

(10) The system preferably further includes a heating unit that heats the gasification furnace; and a water supply unit that supplies water into the gasification furnace, in which the control unit preferably reduces either or both of the amount of heat introduced from the heating unit into the gasification furnace and the amount of water supplied from the water supply unit into the gasification furnace so as to reduce the amount of carbon dioxide emitted in the gasification unit.

(11) In the system, the control unit preferably selects and performs one of the hydrogen consumption reducing control and a hydrogen production increasing control to purchase electric power and to increase the amount of hydrogen produced by the electrolysis unit, and the control unit preferably calculates a first increase available if the hydrogen consumption reducing control is performed and calculates a second increase available if the hydrogen production increasing control is performed, and the control unit preferably performs the hydrogen consumption reducing control when the first increase is smaller than the second increase, and preferably performs the hydrogen production increasing control when the first increase is larger than the second increase.

(12) In the system, the hydrogen supply unit preferably supplies hydrogen into the gasification furnace or a biomass feedstock supply channel (e.g., a feedstock supply channel 20) connected to the gasification furnace in the gasification unit.

(13) In the system, the control unit preferably controls the amount of hydrogen supplied by the hydrogen supply unit to adjust, to a predetermined ratio, the $H_2/CO$ ratio of a syngas discharged from the gasification furnace.

(14) In the system, the control unit preferably changes the amount of hydrogen supplied by the hydrogen supply unit according to the type of the biomass feedstock in the gasification furnace.

(1) The fuel production system according to an aspect of the present invention includes a gasification unit including a gasification furnace that gasifies biomass feedstock; a liquid fuel production unit that produces a liquid fuel from the syngas produced by the gasification unit; an electrolysis unit that produces hydrogen from water using electric power generated using renewable energy; a hydrogen tank that stores the hydrogen produced by the electrolysis unit; a remaining hydrogen amount determining section that determines the amount of hydrogen remaining in the hydrogen tank; and a hydrogen supply unit that supplies the hydrogen from the hydrogen tank to the gasification unit. According to the present invention, hydrogen is produced by the electrolysis unit and then stored in the hydrogen tank, so that a sufficient amount of renewable energy can be used to produce hydrogen regardless of fluctuations in the environmental conditions and a necessary amount of hydrogen can be supplied from the hydrogen tank to the gasification unit. In the fuel production system according to the present invention, the control unit performs a hydrogen consumption increasing control to reduce the $H_2/CO$ ratio of the syngas produced by reaction in the gasification furnace and to increase the amount of hydrogen supplied by the hydrogen supply unit, when the remaining amount of hydrogen is more than a predetermined amount. When the $H_2/CO$ ratio of the syngas produced by reaction in the gasification furnace is reduced, the amount of hydrogen can be increased as much as necessary to adjust the $H_2/CO$ ratio of the syngas, supplied from the gasification unit to the liquid fuel production unit, to a predetermined ratio according to the liquid fuel to be produced. In the present invention, such a hydrogen consumption increasing control is performed when the remaining amount of hydrogen is more than a predetermined amount. This accelerates the consumption of hydrogen from the hydrogen tank while the $H_2/CO$ ratio of the syngas supplied from the gasification unit to the liquid fuel production unit is kept constant, so that the remaining amount of hydrogen is successfully reduced so as not to exceed the maximum capacity of the hydrogen tank. According to the present invention, therefore, a sufficient amount of renewable energy is used during the production of the liquid fuel.

(2) In the fuel production system according to the present invention, the control unit may reduce the amount of heat introduced from the heating unit into the gasification furnace to reduce the $H_2/CO$ ratio of the syngas produced by reaction in the gasification furnace. This feature makes it possible to suppress the energy consumption of the heating unit, so that the amount of hydrogen remaining in the hydrogen tank can be reduced while the total amount of carbon dioxide emission is kept low throughout the fuel production system.

(3) In the fuel production system according to the present invention, the control unit may reduce the amount of water supplied from the water supply unit to the gasification furnace to reduce the $H_2/CO$ ratio of the syngas produced by reaction in the gasification furnace. This feature makes it possible to reduce the amount of tar produced by reaction in the gasification furnace. When the amount of water supply is reduced, the energy consumption of the heating unit can be reduced by an amount corresponding to the latent heat of water in the gasification furnace, so that the amount of hydrogen remaining in the hydrogen tank can be reduced while the total amount of carbon dioxide emission is kept low throughout the fuel production system.

(4) In the fuel production system according to the present invention, the control unit may reduce either or both of the amount of heat introduced from the heating unit into the gasification furnace and the amount of water supplied from the water supply unit into the gasification furnace so as to reduce the amount of carbon dioxide emitted in the gasification unit. This feature makes it possible to reduce the amount of hydrogen remaining in the hydrogen tank while the total amount of carbon dioxide emission is kept low throughout the fuel production system.

(5) Instead of performing the hydrogen consumption increasing control, the remaining amount of hydrogen may be reduced by performing a hydrogen production reducing control to sell electric power generated using renewable energy and to reduce the amount of hydrogen produced by the electrolysis unit. In this case, the control unit may calculate a first gain available if the hydrogen consumption increasing control is performed and calculate a second gain available if the hydrogen production reducing control is performed, and the control unit may perform the hydrogen consumption increasing control when the first gain is larger than the second gain, and may perform the hydrogen production reducing control when the first gain is smaller than the second gain. This operation successfully reduces the amount of hydrogen remaining in the hydrogen tank while reducing the liquid fuel production cost.

(6) As mentioned above, the hydrogen consumption increasing control may be performed to reduce the amount of heat introduced into the gasification furnace and to increase the efficiency of syngas production in the gasification furnace. In this case, the control unit may calculate the first gain based on a gain available if the amount of heat introduction is reduced and based on a gain available if the efficiency of syngas production is increased. This operation makes it possible to more reliably reduce the liquid fuel production cost.

(7) In fuel production system according to the present invention, the control unit may perform a hydrogen consumption reducing control to increase the $H_2/CO$ ratio of the syngas produced by reaction in the gasification furnace and to reduce the amount of hydrogen supplied by the hydrogen supply unit, when the remaining amount of hydrogen is less than a predetermined amount. In this case, when the $H_2/CO$ ratio of the syngas produced by reaction in the gasification furnace is increased, the amount of hydrogen can be reduced as much as necessary to adjust the $H_2/CO$ ratio of the syngas, supplied from the gasification unit to the liquid fuel production unit, to a predetermined ratio according to the liquid fuel to be produced. In the present invention, such a hydrogen consumption reducing control may be performed when the remaining amount of hydrogen is less than a predetermined amount. This decelerates the consumption of hydrogen from the hydrogen tank while the $H_2/CO$ ratio of the syngas supplied from the gasification unit to the liquid fuel production unit is kept constant, so that the remaining amount of hydrogen is prevented from falling below the minimum capacity of the hydrogen tank. Therefore, the present invention makes it possible to use a sufficient amount of renewable energy during the production of the liquid fuel.

(8) In the fuel production system according to the present invention, the control unit may increase the amount of heat introduced from the heating unit into the gasification furnace to increase the $H_2/CO$ ratio of the syngas produced by reaction in the gasification furnace. This feature provides a simple measure for increasing the $H_2/CO$ ratio of the syngas produced by reaction in the gasification furnace and for increasing the amount of hydrogen remaining in the hydrogen tank.

(9) In the fuel production system according to the present invention, the control unit may increase the amount of water supplied from the water supply unit into the gasification furnace to increase the $H_2/CO$ ratio of the syngas produced by reaction in the gasification furnace. This feature provides a simple measure for increasing the $H_2/CO$ ratio of the syngas produced by reaction in the gasification furnace and for increasing the amount of hydrogen remaining in the hydrogen tank.

(10) In the fuel production system according to the present invention, the control unit may reduce either or both of the amount of heat introduced from the heating unit into the gasification furnace and the amount of water supplied from the water supply unit into the gasification furnace so as to reduce the amount of carbon dioxide emitted in the gasification unit. This operation successfully increases the amount of hydrogen remaining in the hydrogen tank while keeping low the total amount of carbon dioxide emission throughout the fuel production system.

(11) Instead of performing the hydrogen consumption reducing control, the remaining amount of hydrogen may be increased by performing a hydrogen production increasing control to purchase electric power and to increase the amount of hydrogen produced by the electrolysis unit. In this case, the control unit may calculate a first increase available if the hydrogen consumption reducing control is performed and calculate a second increase available if the hydrogen production increasing control is performed, and the control unit may perform the hydrogen consumption reducing control when the first increase is smaller than the second increase, and may perform the hydrogen production increasing control when the first increase is larger than the second increase. This operation successfully increases the amount of hydrogen remaining in the hydrogen tank while reducing the amount of carbon dioxide emission associated with the liquid fuel production.

(12) In the fuel production system according to the present invention, the hydrogen supply unit may supply hydrogen into the gasification furnace or a biomass feedstock supply channel connected to the gasification furnace in the gasification unit. This feature makes it possible to suppress the reaction between carbon monoxide and water in the gasification furnace, so that the amount of carbon dioxide emitted in the gasification furnace can be kept low. When the hydrogen is supplied from the hydrogen tank into the gasification furnace or the feedstock supply channel, the $H_2/CO$ ratio of the syngas discharged from the gasification furnace can be adjusted to a predetermined ratio according to the liquid fuel to be produced, which eliminates the need for a $H_2/CO$ ratio control step to be actively performed as in the conventional art.

(13) In the fuel production system according to the present invention, the control unit may control the amount of hydrogen supplied by the hydrogen supply unit to adjust the $H_2/CO$ ratio of the syngas discharged from the gasification furnace. This eliminates the need to adjust the $H_2/CO$ ratio of the syngas to a predetermined ratio between the gasification furnace and the liquid fuel production unit, which can make the total amount of carbon dioxide emission throughout the fuel production system smaller than that achieved by the $H_2/CO$ ratio control performed in the conventional art and can simplify the overall configuration of the fuel production system.

(15) The optimum amount of hydrogen supplied to minimize the amount of carbon dioxide produced by reaction in the gasification furnace varies depending on the type of the biomass feedstock introduced into the gasification furnace. To address this, the control unit may change the amount of hydrogen supplied by the hydrogen supply unit according to the type of the biomass feedstock in the gasification furnace, so that the amount of carbon dioxide produced in the gasification furnace can be reduced to as small as possible regardless of the type of the biomass feedstock.

BRIEF DESCRIPTION OF THE DRAWINGS

FIG. 3 is a diagram showing the relationship between the concentration of each component in the syngas produced in the gasification furnace and the temperature in the gasification furnace in a case where the amount of hydrogen supplied from outside the gasification furnace is zero; and FIG. 9 is a flowchart showing a specific procedure for a remaining amount increasing operation.

DETAILED DESCRIPTION OF THE INVENTION

Hereinafter, a fuel production system 1 according to an embodiment of the present invention will be described with reference to the drawings.

Figure 1:
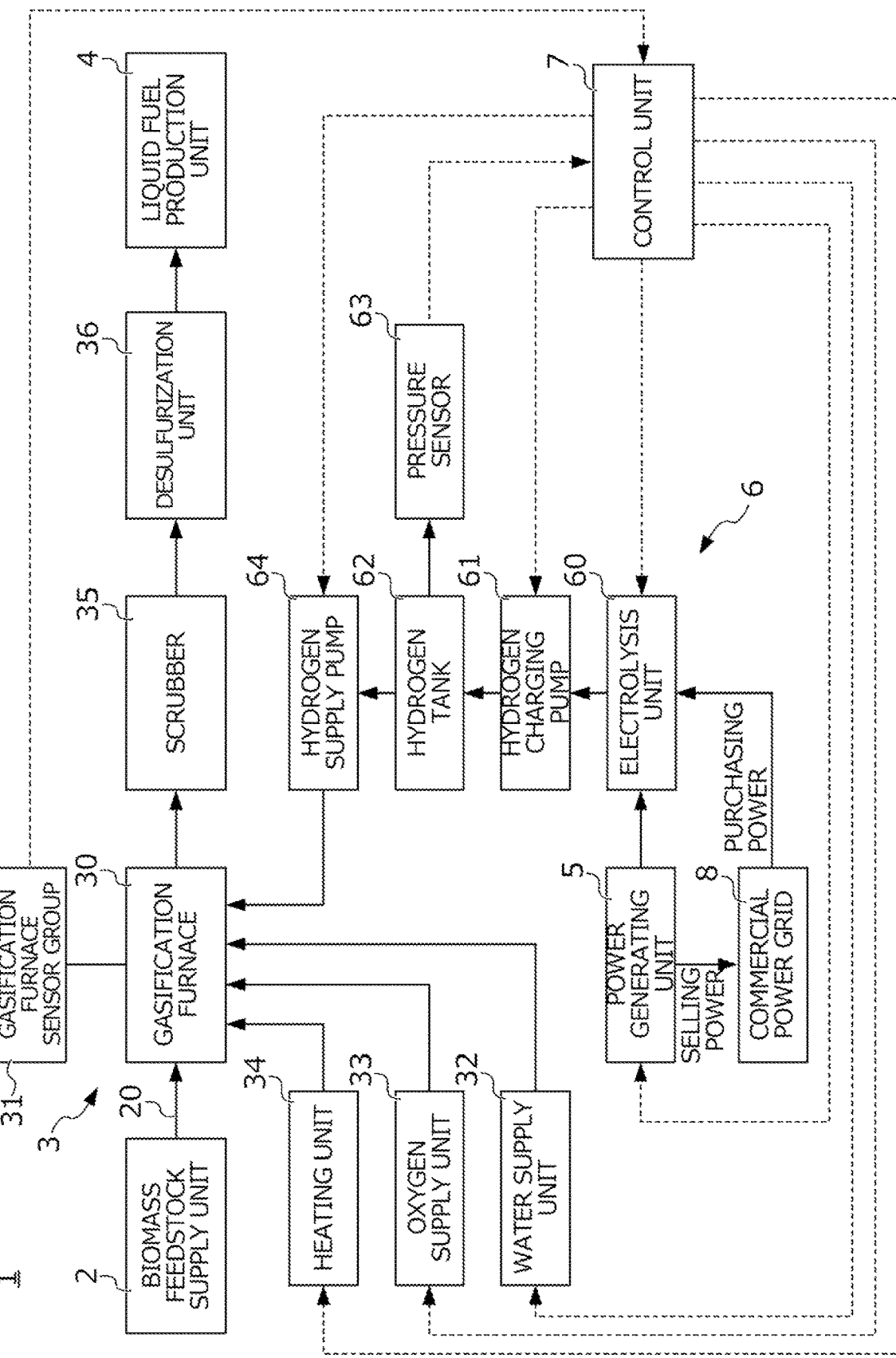
FIG. 1 is a diagram showing the configuration of a fuel production system according to an embodiment of the present invention.

FIG. 1 is a diagram showing the configuration of the fuel production system 1 according to an embodiment of the present invention. The fuel production system 1 includes a biomass feedstock supply unit 2 that supplies biomass feedstock; a gasification unit 3 that gasifies biomass feedstock supplied from the biomass feedstock supply unit 2 to produce a syngas including hydrogen and carbon monoxide; a liquid fuel production unit 4 that produces a liquid fuel from the syngas supplied from the gasification unit 3; a power generating unit 5 that generates electric power using renewable energy; a hydrogen production and supply unit 6 that produces hydrogen from water using the electric power generated by the power generating unit 5 and to supply the produced hydrogen to the gasification unit 3; and a control unit 7 that controls the gasification unit 3, the power generating unit 5, and the hydrogen production and supply unit 6. The system 1 uses these components to produce a liquid fuel from biomass feedstock.

The biomass feedstock supply unit 2 pretreats, in a given way, biomass feedstock, such as rice hulls, bagasse, and wood, and supplies the pretreated biomass feedstock to a gasification furnace 30 in the gasification unit 3 through a feedstock supply channel 20. The pretreatment performed on the biomass feedstock includes, for example, a drying step including drying the feedstock and a pulverization step including pulverizing the feedstock.

The gasification unit 3 includes a gasification furnace 30 that gasifies the biomass feedstock supplied through the feedstock supply channel 20; a group 31 of gasification furnace sensors including multiple sensors that each detect the condition of the interior of the gasification furnace 30; a water supply unit 32 that supplies water into the gasification furnace 30; an oxygen supply unit 33 that supplies oxygen into the gasification furnace 30; a heating unit 34 that heats the gasification furnace 30; a scrubber 35 that cleans the syngas discharged from the gasification furnace 30; and a desulfurization unit 36 that removes sulfur components from the syngas cleaned by the scrubber 35 and supplies the desulfurized syngas to the liquid fuel production unit 4.

The water supply unit 32 supplies water from a water tank (not shown), which stores water, into the gasification furnace 30. The oxygen supply unit 33 supplies oxygen from an oxygen tank (not shown), which stores oxygen, into the gasification furnace 30. The heating unit 34 heats the gasification furnace 30 by consuming a fuel supplied from a fuel tank (not shown) or consuming electric power supplied from a power source (not shown). The control unit 7 controls the amount of water supplied from the water supply unit 32 into the gasification furnace 30, the amount of oxygen supplied from the oxygen supply unit 33 into the gasification furnace 30, and the amount of heat introduced from the heating unit 34 into the gasification furnace 30. In the fuel production system 1 according to this embodiment, the supply of hydrogen from the hydrogen production and supply unit 6 into the gasification furnace 30 or the feedstock supply channel 20 will sometimes eliminate the need to actively supply water from the water supply unit 32 into the gasification furnace 30. In this case, the water supply unit 32 may be omitted from the fuel production system 1.

When the water supply unit 32, the oxygen supply unit 33, and the heating unit 34 introduce water, oxygen, and heat, respectively, into the gasification furnace 30 containing the supplied biomass feedstock, forward gasification reactions and backward reactions, such as those represented by formulas (1-1) to (1-5) (ten reactions in total), are allowed to proceed in the gasification furnace 30 so that a syngas including hydrogen and carbon monoxide is produced.

$$C + H_2O \leftrightarrows CO + H_2 \quad (1\text{-}1)$$

$$C + CO_2 \leftrightarrows 2CO \quad (1\text{-}2)$$

$$C + 2H_2 \leftrightarrows CH_4 \quad (1\text{-}3)$$

$$CO + H_2O \leftrightarrows CO_2 + H_2 \quad (1\text{-}4)$$

$$CH_4 + H_2O \leftrightarrows CO + 3H_2 \quad (1\text{-}5)$$

The gasification furnace sensor group 31 includes, for example, a pressure sensor for detecting the pressure in the gasification furnace 30, a temperature sensor for detecting the temperature in the gasification furnace 30, a $H_2/CO$ sensor for detecting the $H_2/CO$ ratio corresponding to the ratio between hydrogen and carbon monoxide in the syngas in the gasification furnace 30, a $CO_2$ sensor for detecting carbon dioxide in the gasification furnace 30, and the like. The sensors in the gasification furnace sensor group 31 send sensor signals to the control unit 7.

The gasification furnace 3 mixes the syngas produced by the gasification reactions and reverse reactions thereof represented by formulas (1-1) to (1-5) above with hydrogen supplied from the hydrogen production and supply unit 6 described later to adjust the $H_2/CO$ ratio of the syngas to a predetermined target ratio (e.g., a target $H_2/CO$ ratio of 2 when methanol is produced) depending on the liquid fuel to be produced, and then supplies the resulting syngas to the liquid fuel production unit 4.

The liquid fuel production unit 4 may include a methanol synthesis unit, a methanol-to-gasoline (MTG) synthesis unit, a Fischer-Tropsch (FT) synthesis unit, and an upgrading unit, or the like and use these units to produce a liquid fuel, such as methanol or gasoline, from the syngas with the $H_2/CO$ ratio adjusted to a predetermined ratio in the gasification unit 3.

The power generating unit 5 may include a wind power generating unit configured to generate electricity by wind power as renewable energy, a solar power generating unit configured to generate electricity from sunlight as renewable energy, or the like. The power generating unit 5 is connected to the hydrogen production and supply unit 6 so that the power generated by the wind power generating unit, the solar power generating unit, or the like using renewable energy is supplied to the hydrogen production and supply unit 6. The power generating unit 5 is also connected to a commercial power grid 8. Thus, some or all of the power generated by the power generating unit 5 can be supplied to the commercial power grid 8 for the purpose of selling the power to a power company.

The hydrogen production and supply unit 6 includes an electrolysis unit 60, a hydrogen charging pump 61, a hydrogen tank 62, a pressure sensor 63, and a hydrogen supply pump 64 and uses these components to produce hydrogen using the power supplied from the power generating unit 5 and then to supply the produced hydrogen to the gasification unit 3.

The electrolysis unit 60, which is connected to the power generating unit 5, produces hydrogen from water by electrolysis using the power supplied from the power generating unit 5. The electrolysis unit 60 is also connected to the commercial power grid 8. Thus, the electrolysis unit 60 can produce hydrogen using either or both of the power supplied from the power generating unit 5 and the power supplied through the commercial power grid 8, which is purchased from the power company. The amount of hydrogen produced by the electrolysis unit 60 is controlled by the control unit 7.

The hydrogen charging pump 61 compresses the hydrogen produced by the electrolysis unit 60 and charges the hydrogen into the hydrogen tank 62. The amount of hydrogen charged by the hydrogen charging pump 61 is controlled by the control unit 7. The hydrogen tank 62 stores the hydrogen compressed by the hydrogen charging pump 61. The pressure sensor 63 detects the pressure in the hydrogen tank 62 and sends a sensor signal to the control unit 7. The amount of hydrogen remaining in the hydrogen tank 62 is calculated by the control unit 7 based on the sensor signal from the pressure sensor 63. In this embodiment, therefore, the remaining hydrogen amount determining section that determines the amount of hydrogen remaining in the hydrogen tank 62 includes the pressure sensor 63 and the control unit 7.

The hydrogen supply pump 64 supplies the hydrogen from the hydrogen tank 62 into the gasification furnace 30 of the gasification unit 3. The amount of hydrogen supplied from the hydrogen supply pump 64 into the gasification furnace 30 is controlled by the control unit 7. FIG. 1 illustrates an embodiment in which the hydrogen is stored in the hydrogen tank 62 and then supplied into the gasification furnace 30 by the hydrogen supply pump 64, which is not intended to limit the present invention. Alternatively, after being stored in the hydrogen tank 62, the hydrogen may be supplied upstream of the gasification furnace 30, more specifically, supplied into the biomass feedstock supply channel 20.

The control unit 7 is a computer that controls the amount of water supplied by the water supply unit 32, the amount of oxygen supplied by the oxygen supply unit 33, the amount of heat introduced by the heating unit 34, the amount of hydrogen produced by the electrolysis unit 60, the amount of hydrogen charged by the hydrogen charging pump 61, the amount of hydrogen supplied by the hydrogen supply pump 64, and so on based on sensor signals from the gasification furnace sensor group 31, the pressure sensor 63 of the hydrogen tank 62, and so on. How the control unit 7 specifically controls the amount of hydrogen supply and the like will be described later with reference to FIGS. 4 to 9.

Next, how the supply of hydrogen into the gasification furnace 30 or the feedstock supply channel 20 in the gasification unit 3 is advantageously effective will be described with reference to FIGS. 2 and 3.

Figure 2:
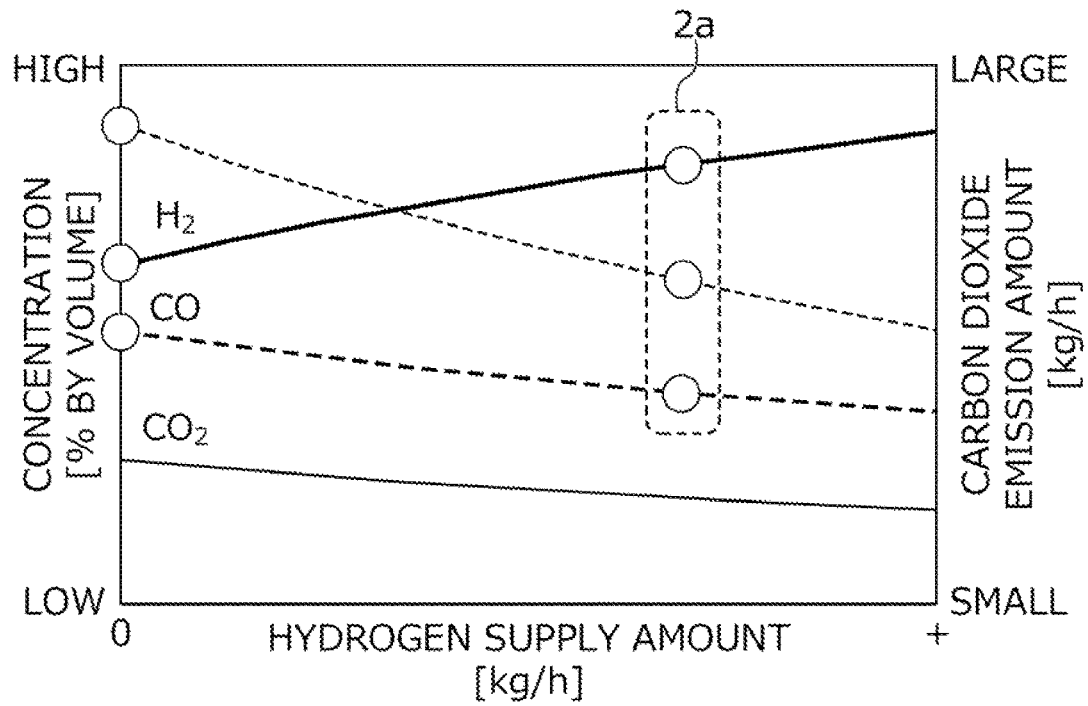
FIG. 2 is a graph showing the relationship between the concentration of each component in the syngas in the gasification furnace and the amount of hydrogen supplied into the gasification furnace.

FIG. 2 is a graph showing the relationship between the concentration (% by volume) of each component in the syngas in the gasification furnace 30 and the rate (kg/h) of hydrogen supply into the gasification furnace 30. FIG. 2 shows the results of simulation under specific conditions. In FIG. 2, the thick solid line indicates the hydrogen concentration of the syngas in the gasification furnace 30, the thick dashed line indicates the carbon monoxide concentration of the syngas in the gasification furnace 30, and the thin solid line indicates the carbon dioxide concentration of the syngas in the gasification furnace 30. FIG. 2 also shows the amount (kg/h) of carbon dioxide production throughout the system, which is indicated by the thin dashed line, in a case where a syngas with a predetermined target ratio is produced at a predetermined rate by the gasification unit 3.

Figure 3:
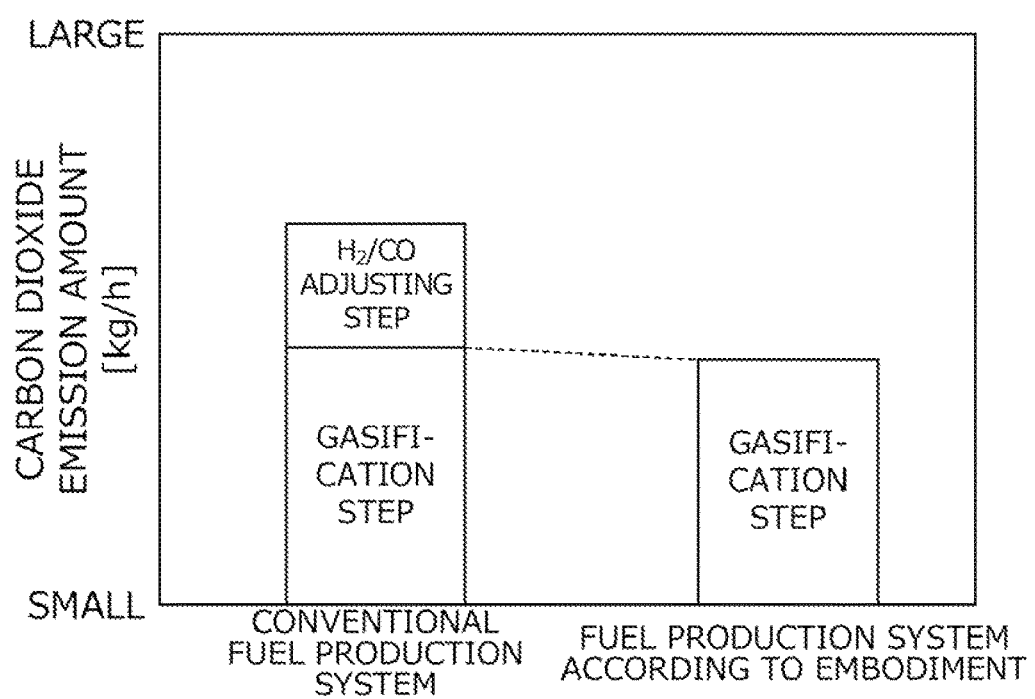
FIG. 3 is a graph showing a comparison between the conventional fuel production system and a fuel production system according to an embodiment of the present invention with respect to the total amount and breakdown amount of carbon dioxide emitted throughout the system when a predetermined amount of syngas with a predetermined target ratio is produced.

FIG. 3 is a graph showing a comparison between the conventional fuel production system and the fuel production system 1 according to this embodiment with respect to the total amount (kg/h) and breakdown amount (kg/h) of carbon dioxide emitted throughout the system when a syngas with a predetermined target ratio is produced at a predetermined rate. In this regard, the conventional fuel production system is configured to adjust, using water, the $H_2/CO$ ratio of the syngas produced by the gasification unit 3 to a target ratio without supplying hydrogen from outside to the gasification unit 3.

As shown in FIG. 2, if the amount of hydrogen supplied into the gasification furnace 30 is set at zero, the $H_2/CO$ ratio of the syngas in the gasification furnace 30 will be smaller than the target ratio. To increase the $H_2/CO$ ratio of the syngas produced by the gasification unit 3 to the target ratio, therefore, it is necessary to further perform a $H_2/CO$ ratio adjusting step that includes allowing water to react with excess of carbon monoxide in the syngas produced in the gasification furnace 30 to increase the $H_2/CO$ ratio. Unfortunately, such a $H_2/CO$ ratio adjusting step causes carbon dioxide emission. In the conventional fuel production system, therefore, carbon dioxide is emitted not only in the gasification step in the gasification furnace 30 but also in the $H_2/CO$ ratio adjusting step an shown in FIG. 3.

To address this, as indicated by the dashed line 2a in FIG. 2, the amount of hydrogen supplied into the gasification furnace 30 is increased, so that the concentration of hydrogen in the syngas in the gasification furnace 30 increases correspondingly. Thus, when the amount of hydrogen supplied into the gasification furnace 30 is controlled to a predetermined amount, the $H_2/CO$ ratio of the syngas in the gasification furnace 30 is successfully adjusted to the target ratio. In the fuel production system 1 according to this embodiment, therefore, it is not necessary to actively perform a $H_2/CO$ ratio adjusting step, so that the amount of carbon dioxide can be made smaller by at least an amount corresponding to no need for such a step than that in the conventional fuel production system.

Moreover, when the amount of hydrogen supplied into the gasification furnace 30 is increased, the amount of water supplied into the gasification furnace 30 can be made smaller than that in the conventional fuel production system, which results in suppression of the reactions for producing carbon monoxide and carbon dioxide among the reactions represented by formulas (1-1) to (1-5) occurring in the gasification furnace 30. That is, as shown in FIG. 2, as the amount of hydrogen supplied into the gasification furnace 30 is increased, the concentration of carbon monoxide and carbon dioxide in the syngas in the gasification furnace 30 decreases. As shown in FIG. 3, therefore, the amount of carbon dioxide emitted in the gasification step in the gasification furnace 30 can be made smaller in the fuel production system 1 according to this embodiment than in the conventional fuel production system. The above demonstrates that the total emission of carbon dioxide can be reduced throughout the fuel production system 1 according to this embodiment.

Figure 4:
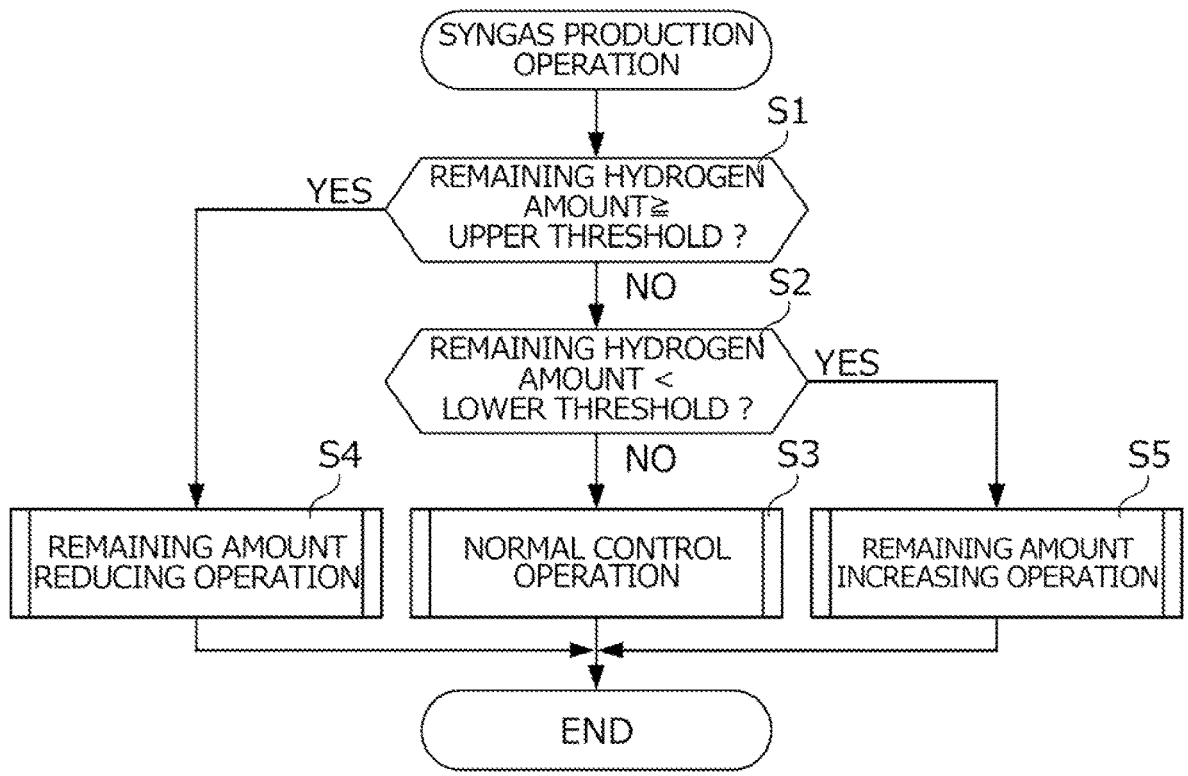
FIG. 4 is a main flowchart of a syngas production operation.

FIG. 4 is a main flowchart of a syngas production operation using the gasification unit 3, the hydrogen production and supply unit 6, and the power generating unit 5. The syngas production operation shown in FIG. 4 is repeatedly performed with a predetermined period by the control unit 7.

Figure 5:
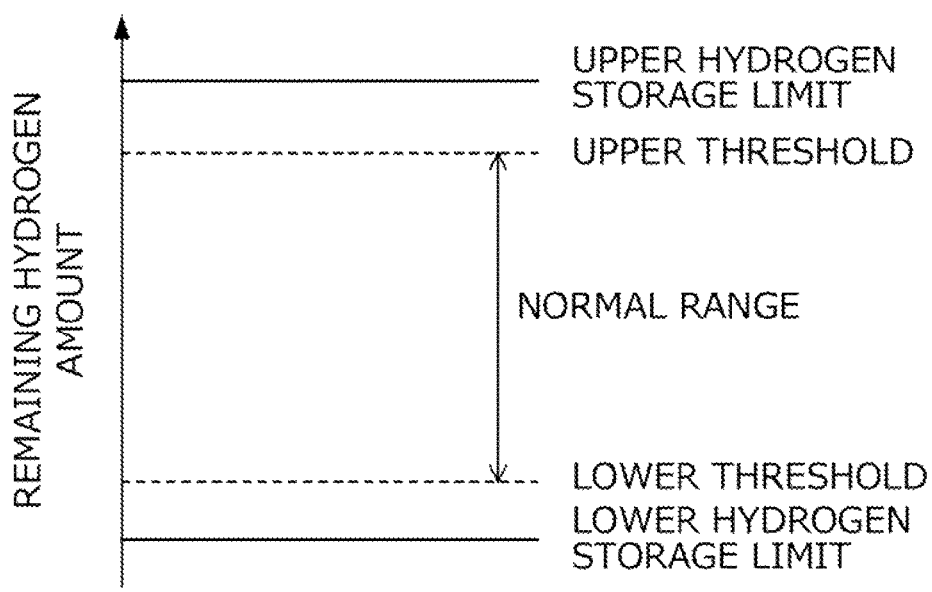
FIG. 5 is a diagram showing threshold values set for the amount of hydrogen remaining in a hydrogen tank.

FIG. 5 is a diagram showing threshold values set for the amount of hydrogen remaining in the hydrogen tank 62, which is for illustrating the concept of the syngas production operation shown in FIG. 4. In FIG. 5, the upper hydrogen storage limit corresponds to the upper limit of the amount of hydrogen storable in the hydrogen tank 62. That is, the hydrogen tank 62 cannot store hydrogen in an amount more than the upper hydrogen storage limit. In FIG. 5, the lower hydrogen storage limit corresponds to the minimum amount of hydrogen that needs to be stored in the hydrogen tank 62 for the supply of hydrogen from the hydrogen tank 62 into the gasification furnace 30 through the hydrogen supply pump 64. Therefore, if the remaining amount of hydrogen falls below the lower hydrogen storage limit, the hydrogen supply pump 64 can no longer supply hydrogen into the gasification furnace 30.

In the syngas production operation, upper and lower thresholds are set with respect to the remaining amount of hydrogen. The upper threshold is set slightly smaller than the upper hydrogen storage limit, and the lower threshold is set smaller than the upper threshold and slightly larger than the lower hydrogen storage limit. In the operation, the gasification unit 3, the hydrogen production and supply unit 6, and the power generating unit 5 are controlled such that the amount of hydrogen remaining in the hydrogen tank 62 is maintained within a normal range between the upper and lower thresholds, in other words, such that the remaining amount of hydrogen will neither depart from the normal range nor reach the upper or lower hydrogen storage limit.

First, in step S1, the control unit 7 calculates the amount of hydrogen remaining in the hydrogen tank 62 based on the sensor signal from the pressure sensor 63 and then determines whether the remaining amount of hydrogen is equal to or more than the upper threshold. When the result of determination in step S1 is NO, the control unit 7 proceeds to step S2. In step S2, the control unit 7 determines whether the amount of hydrogen remaining in the hydrogen tank 62 is less than the lower threshold.

When the result of determination in step S2 is NO, that is, when the amount of hydrogen remaining in the hydrogen tank 62 is within the normal range, the control unit 7 performs a normal control operation (see step S3), which will be described later with reference to FIG. 6, and then ends the operation shown in FIG. 4. As shown in FIG. 5, the remaining amount of hydrogen falling within the normal range may mean that the hydrogen tank 62 has room to receive hydrogen produced by the electrolysis unit 60 and has room to supply hydrogen in an amount necessary for the gasification furnace 30.

When the result of determination in step S1 is YES, that is, when the amount of hydrogen remaining in the hydrogen tank 62 is equal to or more than the upper threshold, the control unit 7 performs a remaining amount reducing operation (see step S4), which will be described later with reference to FIG. 7, and then ends the operation shown in FIG. 4. As shown in FIG. 5, when the remaining amount of hydrogen is equal to or more than the upper threshold, it is necessary to reduce the remaining amount of hydrogen so that the remaining amount will not exceed the upper hydrogen storage limit. As mentioned above, if the remaining amount of hydrogen exceeds the upper hydrogen storage limit, the hydrogen tank 62 can no longer store hydrogen, so that hydrogen can be no longer produced using renewable energy. Therefore, the control unit 7 performs the remaining amount reducing operation to reduce the remaining amount of hydrogen.

When the result of determination in step S2 is YES, that is, when the amount of hydrogen remaining in the hydrogen tank 62 is less than the lower threshold, the control unit 7 performs a remaining amount increasing operation (see step S5), which will be described later with reference to FIG. 9, and then ends the operation shown in FIG. 4. As shown in FIG. 5, when the remaining amount of hydrogen is less than the lower threshold, it is necessary to increase the remaining amount of hydrogen so that the remaining amount will not fall below the lower hydrogen storage limit. As mentioned above, if the remaining amount of hydrogen falls below the lower hydrogen storage limit, the hydrogen supply pump 64 can no long supply hydrogen. Therefore, the control unit 7 performs the remaining amount increasing operation to increase the remaining amount of hydrogen.

As described above, the syngas production operation shown in FIG. 4 includes performing the remaining amount reducing operation when the remaining amount of hydrogen is equal to or more than the upper threshold; performing the remaining amount increasing operation when the remaining amount of hydrogen is less than the lower threshold; and performing the normal control operation when the remaining amount of hydrogen falls within the normal range, so that the remaining amount of hydrogen is maintained within the normal range.

Figure 6:
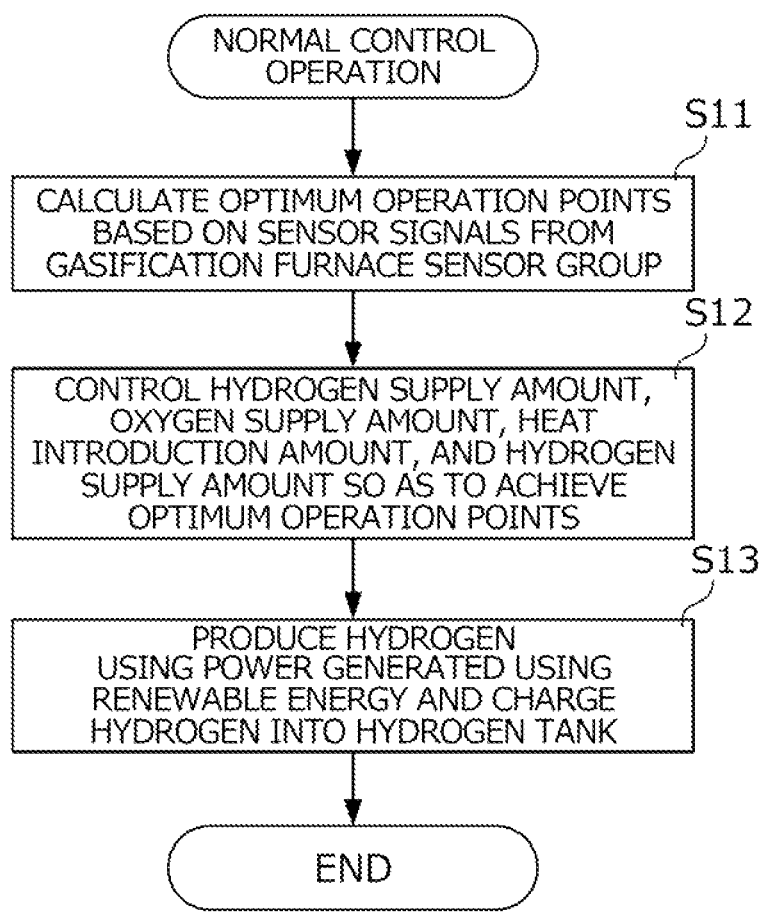
FIG. 6 is a flowchart showing a specific procedure for a normal control operation.

FIG. 6 is a flowchart showing a specific procedure for the normal control operation. First, in step S11, the control unit 7 calculates optimum points for operation of the gasification furnace 30 based on the sensor signals from the gasification furnace sensor group 31. In this case, optimum points for operation of the gasification furnace 30 include the amount of water supplied by the water supply unit 32, the amount of oxygen supplied by the oxygen supply unit 33, the amount of heat introduced by the heating unit 34, and the amount of hydrogen supplied by the hydrogen supply pump 64. Optimum operation points also refer to operation points at which the $H_2/CO$ ratio of the syngas discharged from the gasification furnace 30 reaches a target ratio. The control unit 7 stores a basic map that associates sensor signals from the gasification furnace sensor group 31 with optimum operation points. The control unit 7 calculates optimum operation points through retrieving data from the basic map based on the sensor signals from the gasification furnace sensor group 31.

The optimum points for operation of the gasification furnace 30 vary depending on the type and properties of the biomass feedstock introduced into the gasification furnace 30. Preferably, therefore, the control unit 7 stores basic maps different for each type and property of biomass feedstock, and calculates optimum operation points through selecting the basic maps for reference depending on the type and properties of the biomass feedstock introduced into the gasification furnace 30. Therefore, depending on the type and properties of the biomass feedstock introduced into the gasification furnace 30, the control unit 7 successfully changes the amount of hydrogen supplied by the hydrogen supply pump 64 and so on and adjusts, to a target ratio, the $H_2/CO$ ratio of the syngas discharged from the gasification furnace 30.

The above embodiment shows a case in which optimum operation points are calculated based on a basic map, which is not intended to limit the present invention. Alternatively, optimum operation points may be calculated through a calculation procedure preset based on sensor signals from the gasification furnace sensor group 31 and the type and properties of the biomass feedstock to be introduced into the gasification furnace 30.

In step S12, to achieve optimum operation points through the calculation, the control unit 7 controls the amount of water supplied by the water supply unit 32, the amount of oxygen supplied by the oxygen supply unit 33, the amount of heat introduced by the heating unit 34, and the amount of hydrogen supplied by the hydrogen supply pump 64.

In step S13, the control unit 7 causes the power generating unit 5 to supply the power generated using renewable energy to the electrolysis unit 60, causes the electrolysis unit 60 to produce hydrogen, and causes the hydrogen charging pump 61 to charge the produced hydrogen into the hydrogen tank 62, and then ends the normal control operation shown in FIG. 6.

To maintain the amount of hydrogen remaining in the hydrogen tank 62 within the normal range without large fluctuations, the control unit 7 preferably control the amount of power supplied from the power generating unit 5 to the electrolysis unit 60 or the amount of power generated by the power generating unit 5 such that the amount of hydrogen produced by the electrolysis unit 60 and charged into the hydrogen tank 62 is equal to the amount of hydrogen supplied by the hydrogen supply pump 64, which is calculated in step S11. In some cases, however, the power generating unit 5, which uses renewable energy to generate power, fails to supply the required amount of power to the electrolysis unit 60. In such cases, the remaining amount of hydrogen tends to decrease, since the amount of hydrogen supply becomes larger than the amount of hydrogen production and hydrogen charge. When the remaining amount of hydrogen is sufficiently smaller than the upper threshold, hydrogen may be produced using the entire amount of power generated by the power generating unit 5 and charged into the hydrogen tank 62. In this case, the remaining amount of hydrogen tends to increase, since the amount of hydrogen production and hydrogen charge is larger than the amount of hydrogen supply. This allows the entire amount of available renewable energy to be converted into hydrogen for storage in the hydrogen tank 62.

Figure 7:
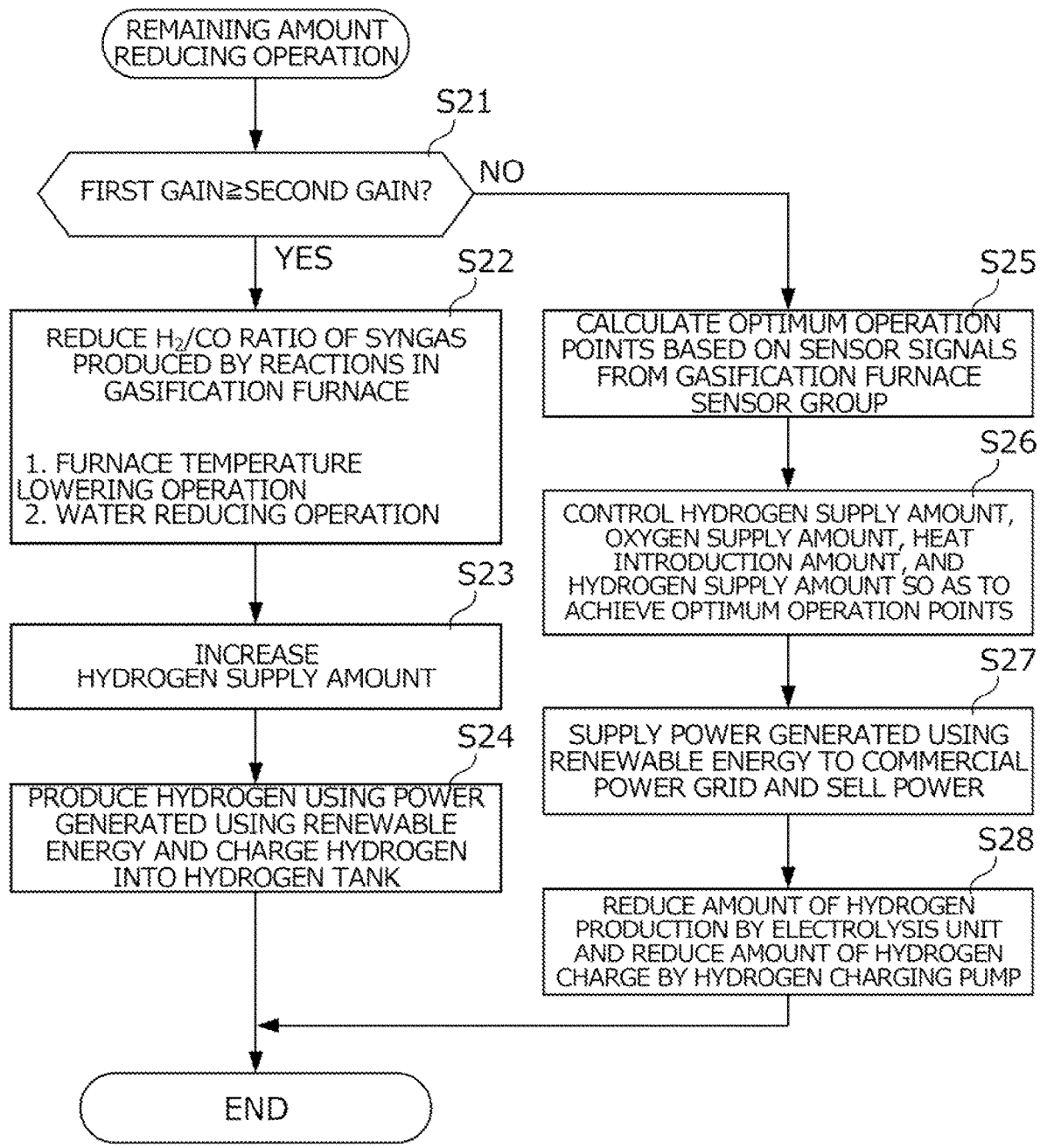
FIG. 7 is a flowchart showing a specific procedure for a remaining amount reducing operation.

FIG. 7 is a flowchart showing a specific procedure for the remaining amount reducing operation to reduce the amount of hydrogen remaining in the hydrogen tank 62. In the fuel production system 1, the hydrogen is supplied from the hydrogen tank 62 to the gasification unit 3 while the hydrogen produced by the electrolysis unit 60 is charged into the hydrogen tank 62. Therefore, to reduce the remaining amount of hydrogen, the control unit 7 is configured to select and perform one of a hydrogen consumption increasing control (steps S22 to S24) to reduce the remaining amount of hydrogen by increasing the consumption of hydrogen in the gasification unit 3 and the amount of hydrogen supplied by the hydrogen supply pump 64; and a hydrogen production reducing control (steps S25 to S28) to reduce the remaining amount of hydrogen by reducing the amount of hydrogen produced by the electrolysis unit 60 and the amount of hydrogen charged by the hydrogen charging pump 61.

First, in step S21, the control unit 7 calculates a first gain available if the hydrogen consumption increasing control is performed; and a second gain available if the hydrogen production reducing control is performed, and then determines whether the first gain is equal to or more than the second gain. When the result of determination in step S21 is YES, that is, when the hydrogen consumption increasing control is more advantageous than the hydrogen production reducing control, the control unit 7 proceeds to step S22. When the result of determination in S21 is NO, that is, when the hydrogen production reducing control is more advantageous than the hydrogen consumption increasing control, the control unit 7 proceeds to step S25. Specific procedures for calculating the first and second gains will be described after the description of specific procedures for the hydrogen consumption increasing control and the hydrogen production reducing control.

In step S22, the control unit 7 changes the optimum operation points from those at the time when the normal control operation is performed to reduce the $H_2/CO$ ratio of the syngas produced by reactions in the gasification furnace 30. As used herein, the expression "syngas produced by reactions in the gasification furnace 30" refers to a part of the syngas in the gasification furnace 30, exclusive of hydrogen supplied from outside the gasification furnace 30 (namely, supplied by the hydrogen supply pump 64). In other words, the "syngas produced by reactions in the gasification furnace 30" is equivalent to syngas produced in the gasification furnace 30 when the amount of hydrogen supplied by the hydrogen supply pump 64 is zero, which differs from the "syngas discharged from the gasification furnace 30".

To reduce the $H_2/CO$ ratio of the syngas in step S22, the control unit 7 is configured to perform either of or a combination of a furnace temperature lowering operation to lower the temperature in the gasification furnace 30; and a water reducing operation to reduce the amount of water supplied into the gasification furnace 30.

Figure 8:
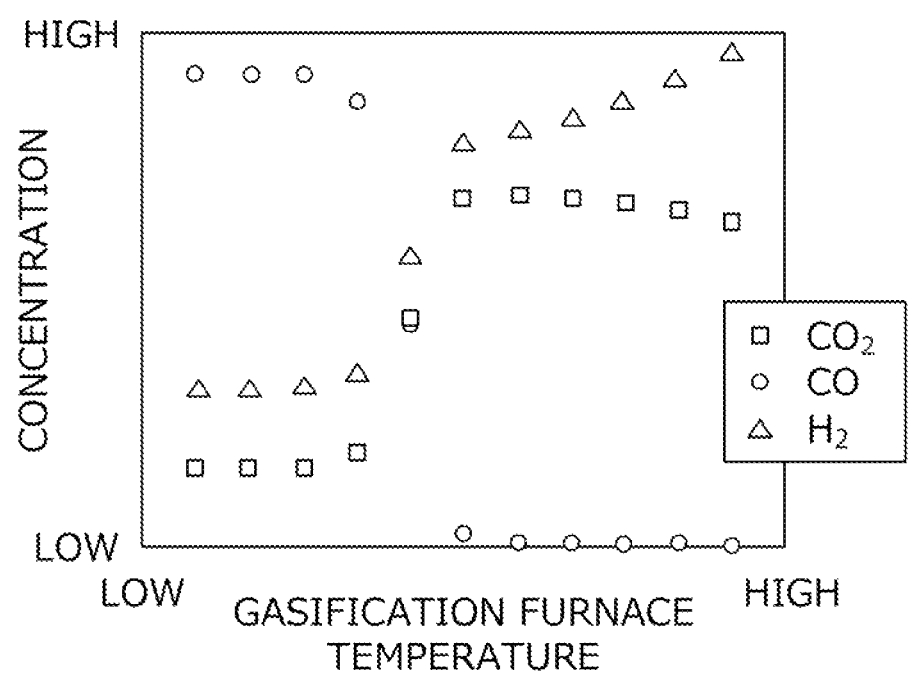

FIG. 8 is a diagram showing the relationship between the concentration of each component in the syngas produced in the gasification furnace 30 and the temperature in the gasification furnace 30 in a case where the amount of hydrogen supplied from outside the gasification furnace 30 is zero. As shown in FIG. 8, as the temperature in the gasification furnace 30 is lowered, the content of carbon monoxide in the syngas increases, whereas the content of hydrogen and carbon dioxide in the syngas decreases. Thus, as the temperature in the gasification furnace 30 is lowered, the $H_2/CO$ ratio of the syngas produced by reactions in the gasification furnace 30 decreases. Taking advantage of this mechanism, the control unit 7 performs the furnace temperature lowering operation to reduce the amount of heat introduced by the heating unit 34, relative to the optimum operation point determined for the normal control operation, so that the temperature in the gasification furnace 30 is forced to be lowered to reduce the $H_2/CO$ ratio of the syngas produced by reactions in the gasification furnace 30.

As shown in FIG. 8, as the temperature in the gasification furnace 30 is lowered, the content of carbon dioxide in the syngas decreases. Moreover, as the amount of heat introduced by the heating unit 34 is reduced, the energy consumption of the heating unit 34 decreases, and thus the amount of carbon dioxide produced in the gasification unit 3 is successfully reduced.

As shown in formulas (1-1) to (1-5) above, as the amount of water supplied into the gasification furnace 30 is reduced, the hydrogen content of the syngas decreases. Taking advantage of this mechanism, the control unit 7 performs the water reducing operation to reduce the amount of water supplied by the water supply unit 32, relative to the optimum operation point determined for the normal control operation, so that the $H_2/CO$ ratio of the syngas produced by reactions in the gasification furnace 30 is reduced. When the amount of water supplied into the gasification furnace 30 is reduced, the amount of heat introduced by the heating unit 34 can be reduced by an amount corresponding to the latent heat of water. Therefore, the control unit 7 preferably reduces the amount of water supplied by the water supply unit 32 and reduces the amount of heat introduced by the heating unit 34 to keep the temperature in the gasification furnace 30 constant.

As shown in formulas (1-1) to (1-5) above, as the amount of water supplied into the gasification furnace 30 is reduced, the carbon dioxide content of the syngas decreases. Moreover, as the amount of heat introduced by the heating unit 34 is reduced, the energy consumption of the heating unit 34 decreases, and thus the amount of carbon dioxide produced in the gasification unit 3 is successfully reduced.

In step S22, the control unit 7 performs either of or a combination of the furnace temperature lowering operation and the water reducing operation to reduce the $H_2/CO$ ratio of the syngas produced by reactions in the gasification furnace 30. More specifically, how much carbon dioxide emission can be reduced differs between when the furnace temperature lowering operation is performed and when the water reducing operation is performed. Preferably, therefore, the control unit 7 reduces one or both of the amount of heat introduced by the heating unit 34 and the amount of water supplied by the water supply unit 32 relative to the optimum operation points determined for the normal control operation so as to minimize the amount of carbon dioxide produced in the gasification unit 3.

In step S23, the control unit 7 increases the amount of hydrogen supplied by the hydrogen supply pump 64 relative to the optimum operation point determined for the normal control operation so as to adjust, to a target ratio, the $H_2/CO$ ratio of the syngas discharged from the gasification furnace 30. When the $H_2/CO$ ratio of the syngas produced by reactions in the gasification furnace 30 is reduced in step S22, the adjustment of the $H_2/CO$ ratio of the syngas discharged from the gasification furnace 30 to a target ratio requires the amount of hydrogen supplied by the hydrogen supply pump 64 to be larger than the optimum operation point determined for the normal control operation. The control of the amount of oxygen supplied by the oxygen supply unit 33 may be basically the same as in the normal control operation, and thus will not be described in detail.

In step S24, according to the same procedure as in step S13 for the normal control operation, the control unit 7 causes the power generating unit 5 to supply the power generated using renewable energy to the electrolysis unit 60, causes the electrolysis unit 60 to produce hydrogen, and causes the hydrogen charging pump 61 to charge the produced hydrogen into the hydrogen tank 62, and then ends the remaining amount reducing operation shown in FIG. 7.

As described above, the hydrogen consumption increasing control (steps S22 to S24) includes reducing the $H_2/CO$ ratio of the syngas produced by reactions in the gasification furnace 30 and increasing the amount of hydrogen supplied by the hydrogen supply pump 64, so that a syngas with the $H_2/CO$ ratio adjusted to a target ratio is produced in the gasification unit 3 while the amount of hydrogen remaining in the hydrogen tank 62 is reduced.

When the hydrogen consumption increasing control is performed as described above, the energy consumption of the heating unit 34 can be reduced. Moreover, as shown in FIG. 2, the amount of carbon dioxide emitted in the gasification furnace 30 decreases as the amount of hydrogen supplied from outside is increased, so that the efficiency of the syngas production in the gasification furnace 30 (the ratio of the amount of the syngas produced in the gasification furnace 30 to the amount of biomass feedstock introduced into the gasification furnace 30) increases. In step S21, therefore, the control unit 7 calculates the first gain by summing the gain available if the amount of heat introduced from the heating unit 34 is reduced and the gain available if the efficiency of the syngas production in the gasification furnace 30 is increased.

In step S25, according to the same procedure as in step S11 for the normal control operation, the control unit 7 calculates optimum points for operation of the gasification furnace 30 based on sensor signals from the gasification furnace sensor group 31.

In step S26, to achieve optimum operation points through the calculation, the control unit 7 controls, according to the same procedure as in step S12 for the normal control operation, the amount of water supplied by the water supply unit 32, the amount of oxygen supplied by the oxygen supply unit 33, the amount of heat introduced by the heating unit 34, and the amount of hydrogen supplied by the hydrogen supply pump 64.

In step S27, the control unit 7 causes the power generating unit 5 to supply some or all of the power generated using renewable energy to the commercial power grid 8 for selling power to the power company.

In step S28, the control unit 7 reduces the amount of hydrogen produced by the electrolysis unit 60 and the amount of hydrogen charged by the hydrogen charging pump 61 by a factor corresponding to the amount of power sold to the power company.

As described above, the hydrogen production reducing control (steps S25 to S28) includes selling the power generated using renewable energy and reducing the amount of hydrogen produced by the electrolysis unit 60, so that a syngas with the $H_2/CO$ ratio adjusted to a target ratio is produced in the gasification unit 3 while the amount of hydrogen remaining in the hydrogen tank 62 is reduced. As described above, the hydrogen production reducing control makes it possible to sell the power generated using renewable energy. In step S21, therefore, the control unit 7 calculates, as the second gain, the gain available if the power generated by the power generating unit 5 is sold to the power company.

FIG. 9 is a flowchart showing a specific procedure for the remaining amount increasing operation to increase the amount of hydrogen remaining in the hydrogen tank 62. In the fuel production system 1, the hydrogen is supplied from the hydrogen tank 62 to the gasification unit 3 while the hydrogen produced by the electrolysis unit 60 is charged into the hydrogen tank 62. Therefore, to increase the remaining amount of hydrogen, the control unit 7 is configured to select and perform one of a hydrogen consumption reducing control (steps S32 to S34) to increase the remaining amount of hydrogen by reducing the amount of hydrogen consumed in the gasification unit 3 and the amount of hydrogen supplied by the hydrogen supply pump 64; and a hydrogen production increasing control (steps S35 to S33) to increase the remaining amount of hydrogen by increasing the amount of hydrogen produced by the electrolysis unit 60 and the amount of hydrogen charged by the hydrogen charging pump 61.

First, in step S31, the control unit 7 calculates a first increase that is the amount of increase of carbon dioxide producible if the hydrogen consumption reducing control is performed, calculates a second increase that is the amount of increase of carbon dioxide producible if the hydrogen production increasing operation is performed, and determines whether the first increase is less than the second increase. When the result of determination in step S31 is YES, that is, when the amount of carbon dioxide production can be made smaller by the hydrogen consumption reducing control than by the hydrogen production increasing control, the control unit 7 proceeds to step S32. When the result of determination in step S31 is NO, that is, when the amount of carbon dioxide production can be made smaller by the hydrogen production increasing control than by the hydrogen consumption reducing control, the control unit 7 proceeds to step S35. Specific procedures for calculating the first and second increases will be described after the description of specific procedures for the hydrogen consumption reducing control and the hydrogen production increasing control.

In step S32, the control unit 7 changes the optimum operation points from those for the normal control operation to increase the $H_2/CO$ ratio of the syngas produced by reactions in the gasification furnace 30.

To increase the $H_2/CO$ ratio of the syngas in step S32, the control unit 7 is configured to perform either of or a combination of a furnace temperature raising operation to raise the temperature in the gasification furnace 30 and a water increasing operation to increase the amount of water supplied into the gasification furnace 30. More specifically, the control unit 7 performs the furnace temperature raising operation to increase the amount of heat introduced by the heating unit 34, relative to the optimum operation point determined for the normal control operation, so that the temperature in the gasification furnace 30 is forced to be raised to increase the $H_2/CO$ ratio of the syngas produced by reactions in the gasification furnace 30. In addition, the control unit 7 performs the water increasing operation to increase the amount of water supplied by the water supply unit 32, relative to the optimum operation point determined for the normal control operation, so that the $H_2/CO$ ratio of the syngas produced by reactions in the gasification furnace 30 is increased. When the amount of water supplied into the gasification furnace 30 is increased, the amount of heat introduced by the heating unit 34 needs to be increased by an amount corresponding to the latent heat of water. Therefore, the control unit 7 preferably increases the amount of water supplied by the water supply unit 32 and increases the amount of heat introduced by the heating unit 34 to keep the temperature in the gasification furnace 30 constant.

In step S32, the control unit 7 performs either of or a combination of the furnace temperature raising operation and the water increasing operation to increase the $H_2/CO$ ratio of the syngas produced by reactions in the gasification furnace 30. More specifically, how much carbon dioxide can be produced in the gasification unit 3 differs between when the furnace temperature raising operation is performed and when the water increasing operation is performed. Preferably, therefore, the control unit 7 increases one or both of the amount of heat introduced by the heating unit 34 and the amount of water supplied by the water supply unit 32 relative to the optimum operation points determined for the normal control operation so as to reduce the amount of carbon dioxide produced in the gasification unit 3.

In step S33, the control unit 7 reduces the amount of hydrogen supplied by the hydrogen supply pump 64 relative to the optimum operation point determined for the normal control operation so as to adjust, to a target ratio, the $H_2/CO$ ratio of the syngas discharged from the gasification furnace 30. When the $H_2/CO$ ratio of the syngas produced by reactions in the gasification furnace 30 is increased in step S32, the adjustment of the $H_2/CO$ ratio of the syngas discharged from the gasification furnace 30 to a target ratio requires the amount of hydrogen supplied by the hydrogen supply pump 64 to be smaller than the optimum operation point determined for the normal control operation. The control of the amount of oxygen supplied by the oxygen supply unit 33 may be the same as in the normal control operation, and thus will not be described in detail.

In step S34, according to the same procedure as in step S13 for the normal control operation, the control unit 7 causes the power generating unit 5 to supply the power generated using renewable energy to the electrolysis unit 60, causes the electrolysis unit 60 to produce hydrogen, and causes the hydrogen charging pump 61 to charge the produced hydrogen into the hydrogen tank 62, and then ends the remaining amount increasing operation shown in FIG. 9.

As described above, the hydrogen consumption reducing control (steps S32 to S34) includes increasing the $H_2/CO$ ratio of the syngas produced by reactions in the gasification furnace 30 and reducing the amount of hydrogen supplied by the hydrogen supply pump 64, so that a syngas with the $H_2/CO$ ratio adjusted to a target ratio is produced in the gasification unit 3 while the amount of hydrogen remaining in the hydrogen tank 62 is increased.

When the hydrogen consumption reducing control is performed as described above, the energy consumption of the heating unit 34 will increase. Moreover, as shown in FIG. 2, the amount of carbon dioxide emitted in the gasification furnace 30 increases as the amount of hydrogen supplied from outside is reduced. In step S31, therefore, the control unit 7 calculates the first increase by summing an increase in carbon dioxide amount possible if the amount of heat introduced by the heating unit 34 is increased and an increase in carbon dioxide amount possible if the amount of hydrogen supplied from outside is reduced.

In step S35, according to the same procedure as in step S11 for the normal control operation, the control unit 7 calculates optimum points for operation of the gasification furnace 30 based on sensor signals from the gasification furnace sensor group 31.

In step S36, to achieve optimum operation points through the calculation, the control unit 7 controls, according to the same procedure as in step S12 for the normal control operation, the amount of water supplied by the water supply unit 32, the amount of oxygen supplied by the oxygen supply unit 33, the amount of heat introduced by the heating unit 34, and the amount of hydrogen supplied by the hydrogen supply pump 64.

In step S37, the control unit 7 causes the power through the commercial power grid 8 to be purchased from the power company and causes the electrolysis unit 60 to receive the purchased power and the power generated by the power generating unit 5 using renewable energy.

In step S38, the control unit 7 increases the amount of hydrogen produced by the electrolysis unit 60 and the amount of hydrogen charged by the hydrogen charging pump 61 by a factor corresponding to the power supplied by the power generating unit 5 and to the power purchased from the power company.

As described above, the hydrogen production increasing control (steps S35 to S38) includes purchasing the power from the power company and increasing the amount of hydrogen produced by the electrolysis unit 60, so that a syngas with the $H_2/CO$ ratio adjusted to a target ratio is produced in the gasification unit 3 while the amount of hydrogen remaining in the hydrogen tank 62 is increased. As described above, the hydrogen production increasing control includes purchasing power. In step S31, therefore, the control unit 7 calculates, as the second increase, the amount of hydrogen producible if the power is purchased instead of generating power from renewable energy.

The fuel production system 1 according to this embodiment brings about advantageous effects as follows.

(1) The fuel production system 1 includes the gasification furnace 30 that gasifies biomass feedstock to produce a syngas; the liquid fuel production unit 4 that produces a liquid fuel from the syngas; the electrolysis unit 60 that produces hydrogen from water using electric power generated using renewable energy; and the hydrogen supply pump 64 that supplies the hydrogen produced by the electrolysis unit 60 into the gasification furnace 30 or the biomass feedstock supply channel 20 connected to the gasification furnace 30. In the fuel production system 1, the hydrogen produced by the electrolysis unit 60 is supplied into the gasification furnace 30 or the feedstock supply channel 20 to suppress the reaction between carbon monoxide and water in the gasification furnace 30, so that the amount of carbon dioxide produced in the gasification furnace 30 can be kept smaller than that achievable in the invention disclosed in Patent Document 1. In the fuel production system 1, the hydrogen produced by the electrolysis unit 60 is supplied into the gasification furnace 30 or the feedstock supply channel 20, so that the $H_2/CO$ ratio of the syngas discharged from the gasification furnace 30 can be controlled to a target ratio depending on the liquid fuel to be produced, which eliminates the need for a $H_2/CO$ ratio control step to be actively performed as in the conventional art. In the conventional liquid fuel production method, the hydrogen necessary for the production of the liquid fuel is produced by the reaction between carbon monoxide and water in the syngas, which leads to the emission of carbon dioxide. On the other hand, according to the present invention, hydrogen is produced by the electrolysis unit 60 using electric power generated using renewable energy, which makes it possible to reduce the total amount of carbon dioxide emission throughout the fuel production system 1.

(2) The control unit 7 controls the amount of hydrogen supplied by the hydrogen supply pump 64 to adjust the $H_2/CO$ ratio of the syngas discharged from the gasification furnace 30 to a target ratio. This eliminates the need to adjust the $H_2/CO$ ratio of the syngas to a predetermined ratio between the gasification furnace 30 and the liquid fuel production unit 4, which can make the total amount of carbon dioxide emission throughout the fuel production system 1 smaller than that achieved by the $H_2/CO$ ratio control performed in the conventional art and can simplify the overall configuration of the fuel production system 1.

(3) The control unit 7 changes the amount of hydrogen supplied by the hydrogen supply pump 64 according to the type and properties of the biomass feedstock in the gasification furnace 30, which makes it possible to reduce the amount of carbon dioxide produced in the gasification furnace 30 to as small as possible regardless of the type of the biomass feedstock.

(4) The fuel production system 1 includes the hydrogen tank 62 that stores the hydrogen produced by the electrolysis unit 60; and the pressure sensor 63 that determines the amount of hydrogen remaining in the hydrogen tank 62. The amount of power generated using renewable energy varies depending on the environmental conditions. In the fuel production system 1, however, the hydrogen produced by the electrolysis unit 60 is stored in the hydrogen tank 62, so that a desired amount of hydrogen can be supplied from the hydrogen tank 62 while a sufficient amount of hydrogen is produced using renewable energy, which does not depend on changes in environmental conditions. The control unit 7 also controls, based on the remaining amount of hydrogen, the amount of hydrogen supplied by the hydrogen supply pump 64 and the $H_2/CO$ ratio of the syngas produced by reactions in the gasification furnace 30. This makes it possible to accelerate or decelerate the consumption of hydrogen from the hydrogen tank 62 while the $H_2/CO$ ratio of the syngas discharged from the gasification furnace 30 is kept constant.

(5) When the remaining amount of hydrogen is more than the upper threshold, the control unit 7 performs a hydrogen consumption increasing control to reduce the $H_2/CO$ ratio of the syngas produced by reactions in the gasification furnace 30 and to increase the amount of hydrogen supplied by the hydrogen supply pump 64. This feature makes it possible to accelerate the consumption of hydrogen from the hydrogen tank 62 and to prevent the remaining amount of hydrogen from exceeding the maximum capacity of the hydrogen tank while the $H_2/CO$ ratio of the syngas discharged from the gasification furnace 30 is kept constant.

(6) The control unit 7 reduces the amount of heat introduced from the heating unit 34 to the gasification furnace 30 to reduce the $H_2/CO$ ratio of the syngas produced by reactions in the gasification furnace 30. This feature makes it possible to suppress the energy consumption of the heating unit 34, so that the total amount of carbon dioxide emission can be further reduced throughout the fuel production system 1.

(7) The control unit 7 reduces the amount of water supplied from the water supply unit 32 to the gasification furnace 30 to reduce the $H_2/CO$ ratio of the syngas produced by reactions in the gasification furnace 30. This feature makes it possible to reduce the amount of tar produced by reactions in the gasification furnace 30, which reduces the work of the scrubber 35. Moreover, when the amount of water supply is reduced, the energy consumption of the heating unit 34 can be reduced by an amount corresponding to the latent heat of water in the gasification furnace 30, so that the total amount of carbon dioxide emission can be further reduced throughout the fuel production system 1.

(8) When the remaining amount of hydrogen is less than the lower threshold, the control unit 7 performs a hydrogen consumption reducing control to increase the $H_2/CO$ ratio of the syngas produced by reactions in the gasification furnace 30 and to reduce the amount of hydrogen supplied by the hydrogen supply pump 64. This feature makes it possible to suppress the consumption of hydrogen from the hydrogen tank 62 and to prevent the remaining amount of hydrogen from falling below the minimum capacity of the hydrogen tank 62 while the $H_2/CO$ ratio of the syngas discharged from the gasification furnace 30 is kept constant.

(9) The control unit 7 increases the amount of heat introduced from the heating unit 34 to the gasification furnace 30 to increase the $H_2/CO$ ratio of the syngas produced by reactions in the gasification furnace 30. This feature provides a simple measure for increasing the $H_2/CO$ ratio of the syngas produced by reactions in the gasification furnace 30.

(10) The control unit 7 increases the amount of water supplied from the water supply unit 32 into the gasification furnace 30 to increase the $H_2/CO$ ratio of the syngas produced by reactions in the gasification furnace 30. This feature provides a simple measure for increasing the $H_2/CO$ ratio of the syngas produced by reactions In the gasification furnace 30.

It will be understood that embodiments of the present invention described above are not intended to limit the present invention. Details of the embodiments may also be changed or modified as appropriate within the scope of the gist of the present invention.

The embodiment described above shows a case where the hydrogen is supplied from the hydrogen tank 62 into the gasification furnace 30 or the feed stock supply channel 20 in the gasification unit 3 to adjust, to a target ratio, the $H_2/CO$ ratio of the syngas discharged from the gasification furnace 30. It will be understood that such an embodiment is not intended to limit the present invention. Alternatively, the hydrogen may be supplied from the hydrogen tank 62 to a side downstream of the gasification furnace 30 in the gasification unit 3. In this case, a reactor for adjusting the $H_2/CO$ ratio of the syngas may be provided between the gasification furnace 30 and the liquid fuel production unit 4, and the hydrogen pump 64 may supply the hydrogen from the hydrogen tank 62 into the reactor. In this case, although the $H_2/CO$ ratio of the syngas discharged from the gasification furnace is lower than the target ratio, the amount of hydrogen supplied by the hydrogen supply pump 64 may be controlled to adjust, to the target ratio, the $H_2/CO$ ratio of the syngas supplied to the liquid fuel production unit 4.

What is claimed is:

1. A fuel production system for producing a liquid fuel from biomass feedstock, comprising:
    a gasification unit comprising a gasification furnace configured to gasify biomass feedstock and produce a syngas comprising hydrogen and carbon monoxide;
    an electrolysis unit configured to produce hydrogen from water using electric power generated from renewable energy;
    a hydrogen tank configured to store the hydrogen produced by the electrolysis unit;
    a hydrogen supply unit configured to supply the hydrogen from the hydrogen tank to the gasification unit;
    a remaining hydrogen amount determining section configured to determine an amount of hydrogen remaining in the hydrogen tank;
    a control unit programmed to perform a hydrogen consumption increasing control that reduces a $H_2/CO$ ratio of the syngas and increases an amount of hydrogen supplied by the hydrogen supply unit when the remaining amount of hydrogen is more than a predetermined amount; and
    a liquid-fuel production unit configured to produce a liquid fuel from the syngas.

2. The fuel production system according to claim 1, further comprising a heating unit configured to heat the gasification furnace, wherein the control unit is programmed to reduce an amount of heat introduced from the heating unit into the gasification furnace and reduce the $H_2/CO$ ratio of the syngas.

3. The fuel production system according to claim 2, further comprising a water supply unit configured to supply water into the gasification furnace, wherein the control unit is programmed to reduce an amount of water supplied from the water supply unit into the gasification furnace and reduce the $H_2/CO$ ratio of the syngas.

4. The fuel production system according to claim 2, wherein the control unit is programmed to select and perform one of the hydrogen consumption increasing control and a hydrogen production reducing control that sells electric power generated using renewable energy and reduces an amount of hydrogen produced by the electrolysis unit,
    the control unit is programmed to calculate a first gain available if the hydrogen consumption increasing control is performed and calculate a second gain available if the hydrogen production reducing control is performed, and
    the control unit is programmed to perform the hydrogen consumption increasing control when the first gain is larger than the second gain, and perform the hydrogen production reducing control when the first gain is smaller than the second gain.

5. The fuel production system according to claim 4, wherein the control unit is programmed to calculate the first gain based on a gain available if the hydrogen consumption increasing control is performed and reduce an amount of heat introduced into the gasification furnace based on a gain available if an efficiency of syngas production in the gasification furnace is increased.

6. The fuel production system according to claim 1, further comprising a water supply unit configured to supply water into the gasification furnace, wherein the control unit is programmed to reduce an amount of water supplied from the water supply unit into the gasification furnace and reduce the $H_2/CO$ ratio of the syngas.

7. The fuel production system according to claim 1, further comprising:
a heating unit configured to heat the gasification furnace; and
a water supply unit configured to supply water into the gasification furnace, wherein
the control unit programmed to reduce either or both of an amount of heat introduced from the heating unit into the gasification furnace and an amount of water supplied from the water supply unit into the gasification furnace so as to reduce an amount of carbon dioxide emitted in the gasification unit.

8. The fuel production system according to claim 1, wherein the hydrogen supply unit is configured to supply hydrogen into the gasification furnace or a biomass feedstock supply channel connected to the gasification furnace in the gasification unit.

9. The fuel production system according to claim 8, wherein the control unit is programmed to control an amount of hydrogen supplied by the hydrogen supply unit to adjust, to a predetermined ratio, a $H_2/CO$ ratio of a syngas discharged from the gasification furnace.

10. The fuel production system according to claim 9, wherein the control unit is programmed to change the amount of hydrogen supplied by the hydrogen supply unit according to a type of the biomass feedstock in the gasification furnace.

11. A fuel production system for producing a liquid fuel from biomass feedstock, comprising:
a gasification unit comprising a gasification furnace configured to gasify biomass feedstock and produce a syngas comprising hydrogen and carbon monoxide;
an electrolysis unit configured to produce hydrogen from water using electric power generated from renewable energy;
a hydrogen tank configured to store the hydrogen produced by the electrolysis unit;
a hydrogen supply unit configured to supply the hydrogen from the hydrogen tank to the gasification unit;
a remaining hydrogen amount determining section configured to determine an amount of hydrogen remaining in the hydrogen tank;
a control unit programmed to perform a hydrogen consumption increasing control that reduces a $H_2/CO$ ratio of the syngas and increases an amount of hydrogen supplied by the hydrogen supply unit when the remaining amount of hydrogen is more than a predetermined amount; and
a liquid-fuel production unit configured to produce a liquid fuel from the syngas,
wherein the control unit is programmed to select and perform one of the hydrogen consumption increasing control and a hydrogen production reducing control that sells electric power generated using renewable energy and reduces an amount of hydrogen produced by the electrolysis unit,
the control unit is programmed to calculate a first gain available if the hydrogen consumption increasing control is performed and calculate a second gain available if the hydrogen production reducing control is performed, and
the control unit is programmed to perform the hydrogen consumption increasing control when the first gain is larger than the second gain, and perform the hydrogen production reducing control when the first gain is smaller than the second gain.

12. The fuel production system according to claim 11, wherein the control unit is programmed to calculate the first gain based on a gain available if the hydrogen consumption increasing control is performed and reduce an amount of heat introduced into the gasification furnace based on a gain available if an efficiency of syngas production in the gasification furnace is increased.

13. A fuel production system for producing a liquid fuel from biomass feedstock, comprising:
a gasification unit configured to heat biomass feedstock in a gasification furnace and produce a syngas comprising hydrogen and carbon monoxide;
an electrolysis unit configured to produce hydrogen from water using electric power generated from renewable energy;
a hydrogen tank configured to store the hydrogen produced by the electrolysis unit;
a hydrogen supply unit configured to supply the hydrogen from the hydrogen tank to the gasification unit;
a remaining hydrogen amount determining section configured to determine an amount of hydrogen remaining in the hydrogen tank;
a control unit programmed to perform a hydrogen consumption reducing control that increases a $H_2/CO$ ratio of the syngas and reduces an amount of hydrogen supplied by the hydrogen supply unit when the remaining amount of hydrogen is less than a predetermined amount; and
a liquid-fuel production unit configured to produce a liquid fuel from the syngas.

14. The fuel production system according to claim 13, further comprising a heating unit configured to heat the gasification furnace, wherein the control unit is programmed to increase an amount of heat introduced from the heating unit into the gasification furnace and increase the $H_2/CO$ ratio of the syngas.

15. The fuel production system according claim 13, further comprising a water supply unit configured to supply water into the gasification furnace, wherein the control unit is programmed to increase an amount of water supplied from the water supply unit into the gasification furnace and increase the $H_2/CO$ ratio of the syngas.

16. The fuel production system according to claim 13, further comprising:
a heating unit configured to heat the gasification furnace; and
a water supply unit configured to supply water into the gasification furnace, wherein
the control unit is programmed to reduce either or both of an amount of heat introduced from the heating unit into the gasification furnace and an amount of water supplied from the water supply unit into the gasification furnace so as to reduce an amount of carbon dioxide emitted in the gasification unit.

17. The fuel production system according to claim 13, wherein the control unit is programmed to select and perform one of the hydrogen consumption reducing control and a hydrogen production increasing control that purchases electric power and increases an amount of hydrogen produced by the electrolysis unit,
the control unit is programmed to calculate a first increase available if the hydrogen consumption reducing control is performed and calculate a second increase available if the hydrogen production increasing control is performed, and
the control unit is programmed to perform the hydrogen consumption reducing control when the first increase is smaller than the second increase, and perform the hydrogen production increasing control when the first increase is larger than the second increase.

18. The fuel production system according to claim 13, wherein the hydrogen supply unit is configured to supply hydrogen into the gasification furnace or a biomass feedstock supply channel connected to the gasification furnace in the gasification unit.

19. The fuel production system according to claim 18, wherein the control unit is programmed to control an amount of hydrogen supplied by the hydrogen supply unit and adjust, to a predetermined ratio, a $H_2/CO$ ratio of a syngas discharged from the gasification furnace.

20. The fuel production system according to claim 19, wherein the control unit is programmed to change the amount of hydrogen supplied by the hydrogen supply unit according to a type of the biomass feedstock in the gasification furnace.

* * * * *